United States Patent
Cheng et al.

(10) Patent No.: US 11,213,780 B2
(45) Date of Patent: Jan. 4, 2022

(54) AIR FILTER WITH PASSIVATED FILTER LIFE INDICATOR

(71) Applicant: 3M INNOVATIVE PROPERTIES COMPANY, St. Paul, MN (US)

(72) Inventors: Liang Cheng, Shanghai (CN); Andrew R. Fox, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 437 days.

(21) Appl. No.: 16/319,735

(22) PCT Filed: Aug. 5, 2016

(86) PCT No.: PCT/CN2016/093657
§ 371 (c)(1),
(2) Date: Jan. 22, 2019

(87) PCT Pub. No.: WO2018/023748
PCT Pub. Date: Feb. 8, 2018

(65) Prior Publication Data
US 2019/0151787 A1    May 23, 2019

(51) Int. Cl.
*B01D 46/00*    (2006.01)
*B01D 46/10*    (2006.01)

(52) U.S. Cl.
CPC ......... *B01D 46/0086* (2013.01); *B01D 46/10* (2013.01); *B01D 2275/203* (2013.01)

(58) Field of Classification Search
None
See application file for complete search history.

(56) References Cited

U.S. PATENT DOCUMENTS

| | | | |
|---|---|---|---|
| 2,849,005 A | | 8/1958 | Tucker |
| 3,635,001 A | * | 1/1972 | Komroff .................. F24F 8/10 |
| | | | 96/417 |
| RE30,782 E | | 10/1981 | Van Turnhout |
| 4,547,420 A | * | 10/1985 | Krueger ............ B01D 39/1623 |
| | | | 264/172.14 |
| 4,686,037 A | | 8/1987 | Lang |

(Continued)

FOREIGN PATENT DOCUMENTS

| CN | 102380270 | 3/2012 |
|---|---|---|
| CN | 105363297 | 3/2016 |

(Continued)

OTHER PUBLICATIONS

International Search Report for PCT International Application No. PCT/CN2016/093657, dated Apr. 25, 2017, 5 pages.

*Primary Examiner* — Christopher P Jones
*Assistant Examiner* — Brit E. Anbacht
(74) *Attorney, Agent, or Firm* — Kenneth B. Wood (57) ABSTRACT

An air filter including a visually uniform filter life indicator (30), the air filter (1) comprising: a conformable, unframed air filter media (10) that is installable on at least a portion of an upstream face (11) of a filter-support layer of an air-handling system, wherein the conformable, unframed air filter media comprises at least one passivated area (20) that provides a visually uniform filter life indicator of the air filter. Filter life indicators are used in order that aspects of the filtration performance of an air filter can be monitored.

14 Claims, 5 Drawing Sheets

(56) References Cited

U.S. PATENT DOCUMENTS

| | | | | |
|---|---|---|---|---|
| 4,795,668 A | * | 1/1989 | Krueger | B01D 39/1623 |
| | | | | 428/174 |
| 4,813,948 A | | 3/1989 | Insley | |
| 5,230,800 A | | 7/1993 | Nelson | |
| 5,256,231 A | | 10/1993 | Gorman | |
| 5,338,340 A | * | 8/1994 | Kasmark, Jr. | B01D 39/1623 |
| | | | | 55/486 |
| 5,505,753 A | * | 4/1996 | Heysek | B01D 46/4254 |
| | | | | 96/416 |
| 6,110,260 A | * | 8/2000 | Kubokawa | B01D 46/0086 |
| | | | | 96/26 |
| 6,494,940 B1 | | 12/2002 | Hak | |
| 6,858,290 B2 | | 2/2005 | Mrozinski | |
| 6,979,361 B2 | * | 12/2005 | Mihayiov | B01D 35/143 |
| | | | | 55/DIG. 34 |
| 7,235,115 B2 | * | 6/2007 | Duffy | B01D 46/523 |
| | | | | 156/197 |
| 7,537,632 B2 | | 5/2009 | Miller | |
| 7,754,041 B2 | | 7/2010 | Fox | |
| 7,947,142 B2 | | 5/2011 | Fox | |
| 8,162,153 B2 | | 4/2012 | Fox | |
| 8,231,700 B2 | * | 7/2012 | Sundet | B01D 46/10 |
| | | | | 55/499 |
| 8,685,129 B2 | | 4/2014 | Lise | |
| 8,702,829 B2 | | 4/2014 | Lise | |
| 9,174,159 B2 | | 11/2015 | Sanocki | |
| 9,278,301 B2 | | 3/2016 | Fox | |
| 9,354,231 B1 | * | 5/2016 | Glover | G01N 27/72 |
| 9,539,532 B2 | * | 1/2017 | Fox | B01D 46/0001 |
| 9,579,597 B2 | | 2/2017 | Gruenbacher et al. | |
| 10,286,349 B2 | * | 5/2019 | Gregerson | B01D 46/0086 |
| 11,162,697 B2 | * | 11/2021 | LeBlanc | F24F 1/0011 |
| 2002/0026776 A1 | * | 3/2002 | McNaughton | B01D 46/0005 |
| | | | | 55/495 |
| 2004/0011204 A1 | | 1/2004 | Both | |
| 2007/0034082 A1 | | 2/2007 | Adair | |
| 2008/0038976 A1 | | 2/2008 | Berrigan | |
| 2010/0084347 A1 | * | 4/2010 | Wilder | B01D 46/0086 |
| | | | | 210/717 |
| 2012/0037005 A1 | * | 2/2012 | Jarrier | B01D 46/0086 |
| | | | | 96/414 |
| 2013/0186279 A1 | * | 7/2013 | Dwyer | G01N 21/3151 |
| | | | | 96/418 |
| 2013/0205732 A1 | * | 8/2013 | Gillilan | B01D 46/10 |
| | | | | 55/497 |
| 2015/0253046 A1 | * | 9/2015 | Parker | F24F 5/0035 |
| | | | | 62/304 |
| 2015/0314026 A1 | * | 11/2015 | Mauzerall | A61L 2/00 |
| | | | | 312/209 |
| 2016/0206984 A1 | * | 7/2016 | Berrigan | D04H 3/02 |
| 2016/0310884 A1 | * | 10/2016 | Fox | B01D 46/0086 |
| 2016/0327491 A1 | * | 11/2016 | Wood | G01N 15/082 |
| 2017/0128873 A1 | * | 5/2017 | Gregerson | B01D 46/0086 |
| 2018/0021716 A1 | * | 1/2018 | Li | B01D 46/10 |
| | | | | 55/497 |
| 2018/0207569 A1 | * | 7/2018 | Salpietra | B01D 45/06 |
| 2018/0214813 A1 | * | 8/2018 | Zhong | B01D 53/02 |
| 2019/0151787 A1 | * | 5/2019 | Cheng | B01D 46/0086 |
| 2019/0314746 A1 | * | 10/2019 | Leung | D01D 5/0084 |
| 2019/0314751 A1 | * | 10/2019 | Cheng | B01D 46/521 |
| 2020/0129907 A1 | * | 4/2020 | Fox | B01D 46/10 |

FOREIGN PATENT DOCUMENTS

| | | |
|---|---|---|
| DE | 4413148 | 4/1995 |
| JP | H11-137939 | 5/1999 |
| WO | WO 2013-090052 | 6/2013 |
| WO | WO 2015-094652 | 6/2015 |
| WO | WO 2016-119080 | 8/2016 |

* cited by examiner

AIR FILTER WITH PASSIVATED FILTER LIFE INDICATOR

BACKGROUND

Filter life indicators are sometimes used in order that aspects of the filtration performance of an air filter can be ascertained or monitored.

SUMMARY

Herein is disclosed an air filter comprising a conformable, unframed air filter media comprising at least one passivated area that provides a visually uniform filter life indicator. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

DEFINITIONS

Although terms such as "top", bottom", "upper", lower", "under", "over", "front", "back", "up" and "down", and "first" and "second" may be used in this disclosure, it should be understood that those terms are used in their relative sense only unless otherwise noted. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match. The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. All references herein to numerical parameters (dimensions, ratios, and so on) are understood to be calculable (unless otherwise noted) by the use of average values derived from a number of measurements of the parameter.

Figure 2:
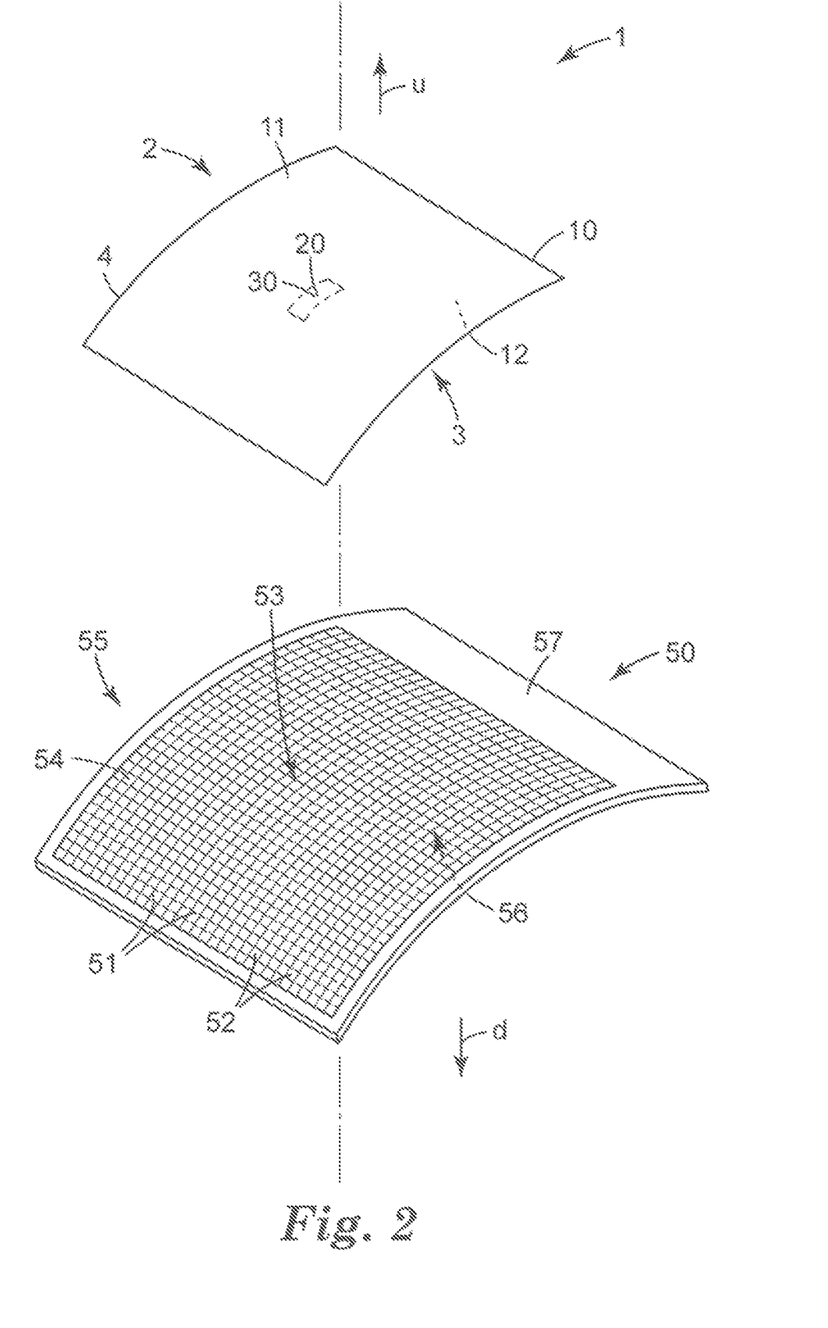
FIG. 2 is a perspective exploded view of an exemplary air filter conformed into an arcuate shape and installed on an arcuate filter-support layer.

The term "upstream" is used to denote the side of an entity (e.g. an air filter or a filter-support layer of an air-handling system) from which moving air (e.g. in an air-handling system) impinges on the entity; the term "downstream" is used to denote the side of an entity through which air exits the entity, both as indicated e.g. in FIG. 2.

The term "conformable" denotes an air filter media (and air filter comprising such media) that is able to be conformed (shaped) into an arcuate configuration.

The term "unframed" denotes an air filter media (and air filter comprising such media) that does not comprise a rigidifying perimeter support frame (e.g., a channel frame, a pinch frame, and so on), as are commonly used with many conventional air filters to maintain the air filter in a planar configuration.

The term "passivated area" denotes an area of an air filter media that is configured so as to not be capable of capturing a significant number of PM2.5 airborne particles and that consequently, during use of the air filter, at least generally retains its original visual appearance even as other, unpassivated areas of the filter media exhibit an altered visual appearance (e.g. darken) due to the capture of PM2.5 airborne particles.

The term "visually uniform filter life indicator" denotes a passivated area of an air filter media that exhibits a visual appearance (e.g. color) that is uniform over the length and width of the passivated area during and after exposure of the air filter media to PM2.5 airborne particles.

The term "PM2.5" is used in accordance with the definition provided by the International Standards Organization (ISO) to denote particles which pass through a size-selective inlet with a 50% efficiency cut-off at 2.5 µm aerodynamic diameter. The concentration of PM2.5 particles in air may be evaluated by well-known methods, such as the use of beta-gauge devices (e.g. the product available under the trade designation MP101 from Environnement SA, Poissy, France).

The term "configured to" and like terms is at least as restrictive as the term "adapted to", and requires actual design intention to perform the specified function rather than mere physical capability of performing such a function.

DETAILED DESCRIPTION

Figure 1:
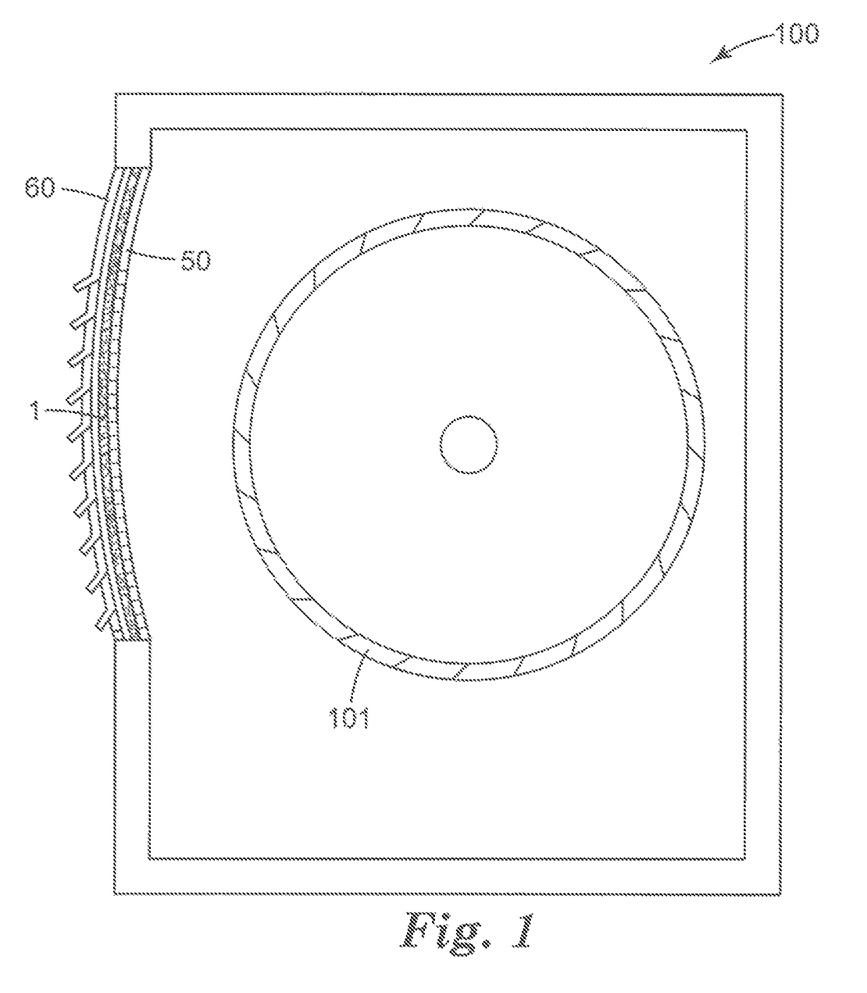
FIG. 1 is a side schematic cross sectional view of a portion of an exemplary air-handling system comprising an exemplary air filter.

Disclosed herein is an air filter 1 that is installable on a filter-support layer 50 of an air-handling system 100, as shown in exemplary embodiment in FIG. 1. As shown in further detail in the exploded view of FIG. 2, air filter 1 is a conformable, unframed air filter comprising conformable, unframed air filter media 10. In some embodiments air filter 1 may be rectangular in shape (which specifically includes square shapes) with e.g. four major lateral edges 4 and four corners; in such embodiments filter media 10 may thus have a generally rectangular perimeter (which does not preclude irregularities, notches, chamfered or angled corners, or the like, in the perimeter of filter media 10). Air filter 1 comprises an upstream side 2 and a downstream side 3; filter media 10 thus comprises an upstream face 11 and a downstream face 12. Air filter media 10 comprises at least one passivated area 20 that provides a visually uniform filter life indicator 30 of air filter 1, as discussed in detail later herein.

Air filter media 10 is conformable; moreover, no rigidifying perimeter support frame being present, air filter 1 is necessarily conformable. By this is meant that air filter 1 can be conformed (curved) into an arcuate shape as depicted in FIG. 2. The conformability is reversible and repeatable and can be performed manually by a user of air filter 1, without the need for any special tools. As will be discussed later in detail, such conforming may be performed so as to conform air filter 1 into an arcuate configuration that matches the shape of an arcuate filter-support layer (e.g. a mesh or screen) of an air-handling system on which air filter 1 is installed. Air filter 1, not bearing any kind of rigidifying frame or structure, is distinguished both from conventional air filters that are permanently held in a planar configuration (irrespective of any local deviations due to e.g. a filter media being pleated) and from so-called cartridge filters that comprise one or more layers of filter media held permanently in an arcuate configuration.

In order to be conformable as described herein, filter media 10 may advantageously exhibit a relatively low stiffness. In some embodiments, the stiffness of the media may be characterized by a Taber Stiffness (measured as described in U.S. Pat. No. 7,235,115, which is incorporated by reference herein for this purpose). In various embodiments, filter media 10 may be comprised of a material that exhibits a Taber Stiffness of less than 1.0, 0.8, 0.6, or 0.4 Taber Stiffness Units. In some embodiments, the stiffness of the media may be characterized by a Gurley Stiffness (measured as described in U.S. Pat. No. 7,947,142, which is incorporated by reference herein for this purpose). In various embodiments, filter media 10 may be comprised of a material that exhibits a Gurley Stiffness of less than 100, 80, or 60 mg.

By definition, filter media 10 (and filter 1) does not include any kind of rigidifying support frame. Specifically, no rigid support frame (e.g., a channel frame of the general type disclosed in U.S. Pat. No. 8,685,129, a channel (box) frame of the general type disclosed in U.S. Pat. No. 7,537,632, a pinch frame of the general type disclosed in U.S. Pat. No. 8,702,829, and the like) is mounted on the perimeter of filter media 10. However, this does not preclude the presence of one or more ancillary components e.g. proximate an edge of filter media 10. Such a component will be described by the term "border strip" for convenience herein. By definition, any such border strip or strips must serve some function (e.g., a fastening function, a decorative function, and so on) other than rigidifying filter 1 so that filter 1 cannot be conformed as disclosed herein. An ordinary artisan will readily appreciate that while, in some embodiments, such a border strip might e.g. impart some degree of lateral stiffness along an edge of filter 1 (which might e.g. make it easier to grasp edges of the filter without it curling or drooping), such a border strip by definition will not impact the ability to conform the filter into an arcuate shape.

Regardless of the specific composition and function, any such border strip will comprise a total thickness (in the upstream-downstream direction of filter 1) that is quite small (e.g., less than 3, 2, or 1 mm). Such a border strip will thus be distinguished from e.g. a section of a perimeter frame (such as a channel frame or the like), such perimeters frames often having a thickness of e.g. 10 mm or more. In general, such a border strip may often take the form of a layer (whether made of cloth, paper, etc.) that is attached proximate an edge of filter 1. By way of specific example, one or more edges of filter 1 might comprise e.g. a strip of mechanical fastening material (e.g., a hook strip or a loop strip of a hook-and-loop fastening system), a strip of pressure-sensitive adhesive, and so on (which might assist in installing the filter on a filter-support layer of an air-handling system). Or, a border strip may provide space to allow a user to record the date of initial installation of the air filter into an air-handling system. In some embodiments, a border strip may be a separately-provided layer that is attached to an edge or border of filter media 10. In other embodiments, a border strip may be provided by way of densifying (e.g., by calendering, ultrasonic welding, needle-tacking, and so on) an edge of filter media 10.

In some embodiments filter media 10 is unpleated (meaning that no identifiable pleats with a pleat height of greater than 1.0 mm are present). In other embodiments filter media 10 may be pleated, e.g. with a pleat height of less than about 20, 15, 10, 5, 4, 3 or 2 mm. In some embodiments any such pleats may be sinusoidal, meaning that the tips of such pleats have an average radius of curvature of at least about 2 mm (Such sinusoidal pleats are distinguished from e.g. "zig-zag" style pleats that comprise extremely flat walls that meet at pleat tips with extremely small radii of curvature.) Filter media 10 can be pleated by any suitable method, e.g. rotary-score pleating, blade-pleating, or processing the media through a set of corrugating gears e.g. in any suitable variation of the methods disclosed in e.g. U.S. Pat. Nos. 5,256,231, 9,278,301, and 9,174,159.

Filter media 10 may comprise any suitable air-filtering material that is capable of being conformed as required. Potentially suitable materials may include e.g. paper; porous films of thermoplastic or thermoset materials; nonwoven (such as meltblown or spunbond, or processed from pre-formed fibers such as staple fibers) webs of synthetic or natural fibers; scrims; woven or knitted materials; foams; electret or electrostatically charged materials; fiberglass media; or laminates or composites of two or more materials. A nonwoven polymeric web comprised of polyethylene, polypropylene or poly(lactic acid) may be suitable, for example. Any suitable method of making a nonwoven web (e.g., melt-blowing, melt-spinning, carding, and so on) may be used. Filter media 10 may also include sorbents, catalysts, and/or activated carbon (granules, fibers, fabric, and molded shapes).

In at least some embodiments, air filter 1 may consist essentially of a single layer of filter media 10, although filter media 10 itself may be a multilayer material. Such media may consist of laminated layers of the media discussed above or of other substrates laminated to one or more layers of filter media, for example. In some embodiments, a prefilter layer may be used on the upstream side of filter media 10. Such a prefilter layer may comprise e.g. polypropylene, polyethylene, polyethylene terephthalate, poly(lactic acid), or blends of these materials. In other words, in some embodiments air filter media 10 may comprise a base (e.g., filtration) layer, along with any other layer or layers as desired for any purpose. For example, a highly open plastic netting or mesh might be laminated to the air filter media, in order to e.g. enhance the abrasion resistance of the media. Any such layer may be bonded to e.g. a base (e.g. filtration)

layer by any suitable method, e.g. by melt-bonding, by way of an adhesive (hot melt adhesive, pressure-sensitive adhesive, and so on), calendering, ultrasonic bonding, needle-tacking, etc.

In specific embodiments, filter media 10 may be an electret material, comprised of e.g. any charged material, e.g. split fibrillated charged fibers as described in U.S. Pat. RE 30,782. Such charged fibers can be formed into a nonwoven web by conventional means and optionally joined to a scrim such as disclosed in U.S. Pat. No. 5,230,800 forming an outer support layer. In other specific embodiments, filter media 10 can be a melt blown microfiber nonwoven web (e.g., such as disclosed in U.S. Pat. No. 4,813,948), that comprises at least some fibers that comprise charged electret moieties. Filter media that may be particularly suitable for certain applications might include e.g. media of the general type described in U.S. Pat. No. 8,162,153 to Fox; media of the general type described in U.S. Patent Application Publication 20080038976 to Berrigan; and, media of the general type described in U.S. Patent Application Publication 20040011204 to Both, and media generally known as tribocharged media. Any such media can be charged to form an electret, if desired.

The material of filter media 10 (e.g., nonwoven fibers) can include any desired additives or ancillary components. In specific embodiments, such fibers may include a colorant (e.g., a white pigment such as calcium carbonate, titanium dioxide, barium carbonate, kaolin clay, and so on) to provide filter media 10 with an initial color that is very white. This may enhance the ease with which the condition of the filter media can be visually assessed, as discussed below.

Passivated Area

Air filter media 10 of air filter 1 comprises at least one passivated area 20 that provides a visually uniform filter life indicator of the air filter. By passivated area is meant an area of air filter media 10 that is not capable of capturing a significant number of PM2.5 airborne particles and that, during use of the air filter, at least generally retains its original visual appearance (i.e., color or shade) even as other, unpassivated areas of the filter media become significantly discolored (e.g., darken) due to the capture of PM2.5 airborne particles. An area of filter media 10 may be passivated in one of two general ways. It may be physically passivated, meaning that airflow through the area may be physically blocked so that little or no airflow can occur through this area of the filter media thus allowing few or no PM2.5 airborne particles to be captured in this area of the media. Or, it may be chemically passivated, meaning that even though air may still be able to flow through this area of the media, in this area the media has been chemically processed (e.g. the area may include few or no charged electret moieties) so that it is not capable of capturing significant quantities of PM2.5 airborne particles that pass through this area of the media. Both of these general approaches are described and discussed in detail below.

Visually Uniform Filter Life Indicator

As noted above, passivated area 20 (or, multiple passivated areas 20 in combination) provides a visually uniform filter life indicator 30. By this is meant that during use of air filter 1 (including at the end of the useful lifetime of air filter 1), passivated area 20 continues to exhibit a uniform visual appearance (e.g. color). That is, passivated area 20 of filter media 10 continues to exhibit a uniform appearance across its entire area, during and after exposure of filter media 10 to PM2.5 airborne particles. In brief, the unpassivated area(s) 26 of the filter media will exhibit a change in appearance (i.e., the unpassivated areas will darken in color) due to capture of PM2.5 airborne particles. (While airborne particles of other sizes may be captured as well, it has been observed that PM2.5 particles, e.g. by way of including large quantities of soot particles, seem to have the strongest effect on the visual appearance of the media.) In contrast, the passivated area(s) will exhibit little overall change in visual appearance, and in particular will not exhibit any significant change in appearance that varies over the length and width of the passivated area. In other words, the visual appearance of regions of passivated area 20 near its lateral edges 21 will not change at a different rate, or to a different extent, relative to that of central regions of passivated area 20 (as illustrated in exemplary representation in FIG. 4). This being the case, a passivated area that provides a visually uniform filter life indicator as disclosed herein, is distinguished from e.g. a visual filter life indicator of the general type disclosed in U.S. Pat. No. 6,110,260 to Kubokawa, in which a change in appearance of a visual indicating area (with continued exposure to airborne particles) progresses inwardly from the region adjacent the periphery of the indicator towards the region adjacent to the center of the indicating area.

Moreover, the arrangements disclosed herein provide an air filter in which a passivated indicating area at least generally retains its original appearance, even as the remaining, unpassivated area of the filter discolors due to the accumulation of PM2.5 particles. In such arrangements the passivated area thus acts as a reference, with the contrast between the appearance of the reference passivated area and the appearance of the increasingly discolored unpassivated area, being the mechanism by which the useful filter lifetime is evaluated. Such arrangements are distinguished from those (e.g. as disclosed in patent DE 4413148A1) in which the change in appearance of an indicating area itself is the mechanism by which a filter is evaluated (rather than the indicating area acting as a reference). It is further noted that the presently disclosed arrangements are distinguished from those that rely on monitoring an increase in pressure drop due to accumulation of particles in an air filter media (as evidence by the discussions in the Working Examples herein). In fact, the presently disclosed arrangements are distinguished from those that rely on a difference in visual appearance that develops commensurate with a change in flow resistance/pressure drop due to accumulation of particles in an air filter media.

Figure 3:
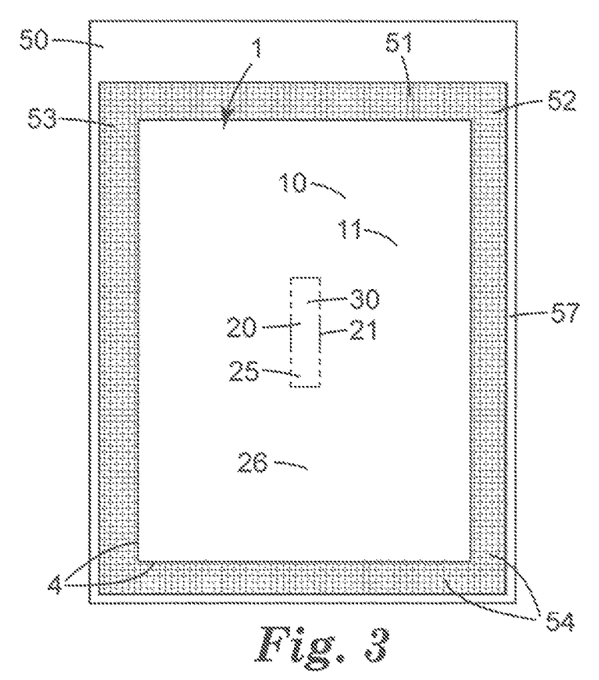
FIG. 3 is a front view of an exemplary air filter installed on a filter-support layer.
Figure 4:
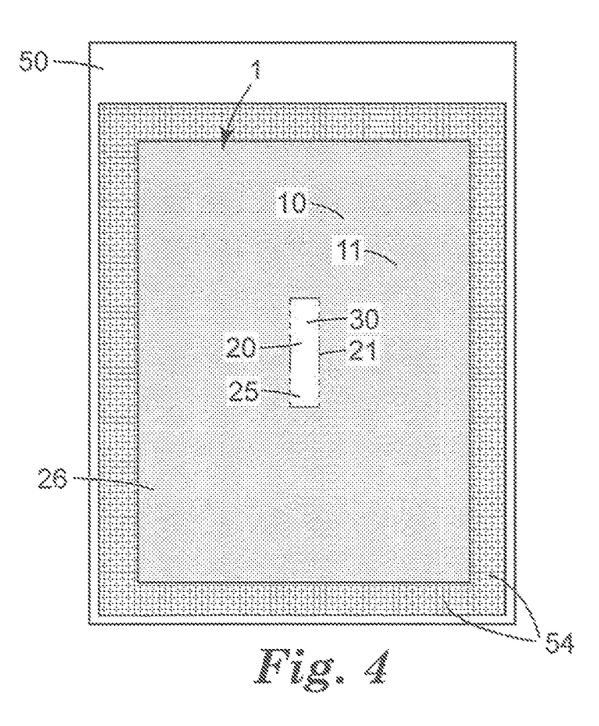
FIG. 4 is a front view of the exemplary air filter of FIG. 3, after a period of use.

In further detail, FIG. 3 depicts an air filter 1 comprising air filter media 10 comprising passivated area 20 that provides a visually uniform filter life indicator 30. Filter 1 is installed on a filter-support layer 50 (FIGS. 3 and 4 are idealized plan views with curvature of layer 50 and filter 1 ignored for ease of presentation). In the particular embodiment of FIG. 3, filter 1 is configured in a high bypass ratio configuration in which filter 1, when installed on a filter-support layer (e.g. screen) 50 of an air-handling system, leaves at least one area 54 in which air can flow through screen 50 without having passed through filter media 10; such arrangements are discussed in detail later herein.

When first installed, all areas of filter media 10 (including both passivated area(s) 20 and non-passivated area(s) 26, may exhibit the same appearance (e.g. color). For example, filter media 10 may exhibit a light beige or white color (as shown in FIG. 3). Over time, as airborne particles (including in particular PM2.5 particles) are captured by non-passivated area 26 of filter media 10, non-passivated area 26 will turn darker in appearance (e.g., will become dark grey or black) as shown in exemplary embodiment in FIG. 4. Passivated area 20, in contrast, is not capable of capturing significant quantities of such particles and will remain at or very close to its original appearance. In particular, the entirety of area 20 will continue to uniformly exhibit this appearance, rather than any sort of gradient occurring in which edges of area 20 darken first, with laterally interior regions of area 20 initially retaining the original light appearance and then gradually darkening as well. This phenomenon of passivated area 20 exhibiting a uniform visual appearance during and after exposure to airborne particles has been repeatedly observed, as evidenced in the Working Examples. The Working Examples also attest that it has been found that the most that passivated area 20 seems to change in appearance is to, in some cases, exhibit a very slight overall darkening (e.g., graying). This has been observed to occur over the entirety of passivated area 20 rather than occurring in a gradient; moreover, it is so mild in appearance (compared to the darkening that occurs of non-passivated area 26) that it would not prevent an ordinary artisan from easily observing the contrast between the passivated and non-passivated areas. Moreover, any such graying of the passivated area often may not become appreciably evident until after the useful lifetime of the filter media has been reached.

Passivated area 20, or multiple passivated areas 20 in combination, should be sufficiently large in size to be readily visible by a user (e.g. when non-passivated area 26 has darkened sufficiently that the visual appearance of area 20 contrasts with that of non-passivated area 26). In various embodiments, passivated area(s) 20 of filter media 10 may exhibit a collective size of at least about 1, 2, 4, 8, or 12 square centimeters. In further embodiments, passivated area may exhibit a size of at most about 100, 80, 60, 40 or 20 square centimeters. In some embodiments, passivated area 20 may occupy at least about 4, 6, 8, or 10 percent of the total area of filter media 10 of air filter 1. In further embodiments, passivated area 20 may occupy at most about 20, 15, or 12 percent of the total area of filter media 10 of air filter 1.

At the end of the useful lifetime of filter media 10, passivated area(s) 20 of air filter media 10 will exhibit a visual appearance (e.g. color or shade) that is lighter than that of non-passivated area(s) 26 of filter media 10. Such a difference may be evaluated e.g. by way of a ΔE (delta-E) difference in the L value in an L*a*b* color space (CIE2000). The CIE L*a*b* color space is a well known method of assessing color, with 0-100 on the L* axis representing the black-white range and with the so-called ΔE (delta-E) parameter representing a difference between two values e.g. on the L* axis. In various embodiments, at the end of the useful lifetime of a filter media 10, the L* axis ΔE of passivated area 20 in comparison to non-passivated area 26 may be at least about 10, 20, 30, 40, 60, or 80. It is further noted that in various embodiments a visually uniform appearance of passivated area 20 (e.g. at the end of the useful lifetime of filter media 10) may correspond to an L* axis ΔE, averaged over passivated area 20, of no more than about 8, 6, 4, or 2. (In such assessments, any small deviations in appearance of area 20 that are clearly due to artifacts such as e.g. an edge of an airflow-blocking member becoming partially dislodged, should be disregarded.) It is still further noted that in various embodiments filter media 10, in its initial condition before being installed in an air-handling system and exposed to an airstream comprising PM2.5 particles, may exhibit a L* value of at least 90, or 95. If desired, the material (e.g. fibers) of filter media 10 may include one or more whitening agents (e.g. pigments such as calcium carbonate, titanium dioxide, and so on) in order to increase the initial L* value of media 10 and to make the difference in visual appearance that occurs upon capture of PM2.5 particles by the non-passivated areas of the filter media more readily apparent.

As used herein, the useful lifetime of a filter media is defined as the time at which the filtration efficiency of the filter has fallen below 50% of its initial value. For such purposes, filtration efficiency can be evaluated using a percent penetration/filtration efficiency/filtration Quality Factor test method as described in the Working Examples herein. It is noted that a user may, if desired, choose to continue using an air filter 1 even after the end of its "useful lifetime"; conversely, a user may, if desired, choose to replace an air filter before it has reached the end of its "useful lifetime". That is, the terminology of a "useful lifetime" is used for convenience to characterize performance in the particular aspect of filtration efficiency and does not imply that an air filter cannot perform at least some beneficial filtration after the "useful lifetime" is reached.

Chemical Passivation

In some embodiments the at least one passivated area 20 is a chemically passivated area 25 (as in the exemplary embodiment of FIG. 3. By this is meant that even though air may still be able to flow through this area of the media (e.g., fibers in this area of filter media 10 may be physically indistinguishable, e.g. in size and shape and in their collective arrangement, from fibers in non-passivated areas of filter media 10), in area 20 the media has been chemically processed so that it is not capable of capturing significant quantities of PM2.5 particles that flow through this area of the media, in comparison to the capability of non-passivated area 26 to capture such particles. In particular embodiments, filter media 10 comprises charged electret moities (e.g., borne by fibers of a nonwoven web such as a blown microfiber web). In such embodiments, passivated area 20 will exhibit a drastically reduced number of such charged electret moities in comparison to non-passivated area 26. Such arrangements can be achieved in any suitable way. For example, area 20 can be physically blocked or shielded by a screen or stencil during a charging process (such as e.g. a corona charging process, a tribocharging process, or a hydrocharging process) so that area 26 is charged while area 20 remains essentially uncharged. Alternatively, the entire area of filter media 10 may be charged, but area 20 may then be post-treated to deactivate the charged electret moities in this area while area 26 remains unaffected. For example, area 20 may be exposed to an alcoholic treatment (e.g., by way of a dipping, soaking, or spraying procedure in which an alcoholic medium is brought into contact with the charge-bearing fibers) while area 26 is physically blocked or shielded. Such an alcoholic treatment may be effective to deactivate many (e.g. substantially all) charged electret moities in the treated area. (The alcoholic medium may of course be removed, e.g. dried, from the treated area of the filter media after the deactivation is complete.) In other embodiments, area 20 may be selectively exposed to high energy radiation, e.g. x-rays or gamma-radiation e.g. as derived from a $Co^{60}$ source, which has in some cases been found to deactivate charged electret moities.

It being non-trivial to directly obtain an accurate measure of e.g. the number of charged electret moities in a web, the deactivation of such an area may be most easily characterized by way of the well known filtration Quality Factor, measured according to the procedures outlined in U.S. Pat. No. 7,754,041 to Fox. As disclosed herein, a chemically passivated area of an air filter media will exhibit a Quality Factor that is less than the Quality Factor of the non-passivated area of the air filter media. In various embodiments, the ratio of the Quality Factor of a chemically passivated area of an air filter media to that of a non-passivated area of the air filter media, may be less than about 0.5, 0.4, 0.3, 0.25, 0.10, or 0.05.

Physical Passivation

In some embodiments the at least one passivated area 20 is a physically passivated area 22. By this is meant that airflow through the area is physically blocked so that little or no airflow can occur through this area of the filter media thus allowing few or no airborne particles to be captured in this area of the media. In other words, even though passivated area 20 may be e.g. an area of a nonwoven fibrous web that includes charged electret moieties and is thus capable of capturing e.g. PM2.5 airborne particles, the airflow through the area is blocked so that no airflow occurs, with the result that very few such particles penetrate this area of the web so as to be captured. In various embodiments, the ratio of the Quality Factor of a physically passivated area of an air filter media to that of a non-passivated area of the air filter media, may be less than about 0.4, 0.25, or 0.10.

Figure 5:
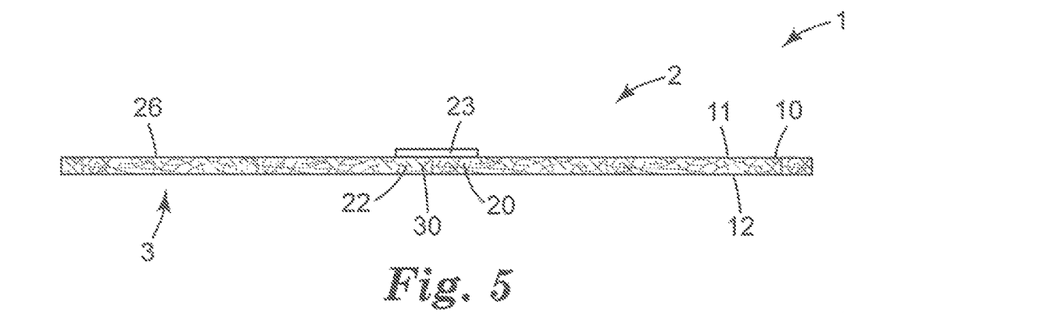
FIG. 5 is a side view of an exemplary air filter comprising a physically passivated area provided by an airflow-blocking member.

As illustrated in exemplary embodiment in FIG. 5, in some embodiments physical passivation may be achieved by affixing an airflow-blocking member 23 to a major surface of filter media 10. Such a member 23 may be e.g. an air-impermeable sheet or film, e.g. with a pressure-sensitive adhesive on one side to allow it to be adhesively adhered to filter media 10. Any suitable material (e.g. an adhesive tape comprising an air-impermeable backing along with a pressure-sensitive adhesive that is suitable for bonding to the filter media in question) can be used. It is not strictly necessary that member 23 (e.g. a layer thereof) must be completely impermeable to air (e.g., must include a dense film). Rather, in some embodiments member 23 merely needs to exhibit sufficiently high flow resistance (e.g., the backing might be a nonwoven web of sufficiently high basis weight and low loft) that it limits the airflow into area 20 to an acceptable amount.

One simple way in which the airflow resistance of member 23 or of a layer thereof may be evaluated is by the use of an air-permeability densometer (such as those densometers available from Gurley Precision Instruments, Troy, N.Y.), in which the time is measured for a specified volume of air to be passed under a specified force through a specified area of the substrate (as described e.g. in U.S. Pat. No. 6,858,290 to Mrozinski). If the substrate has a combination of sufficiently low porosity and/or sufficiently small pore sizes that an appropriate (sufficiently high) densometer time is exhibited, the substrate may be a good candidate for use an airflow-blocking layer. In various embodiments, a suitable substrate may exhibit a 100 cc densometer time of at least about 5 seconds, 10 seconds, 20 seconds, 50 seconds, or 100 seconds. In some embodiments, member 23 may comprise a dense film e.g. with a densometer time e.g. greater than 1000 seconds.

In various embodiments, such an airflow-blocking member 23 may be mounted on an upstream face 11, or on a downstream face 12, of filter media 10. That is, it is not necessary that such a layer must be mounted on an upstream face; it can still effectively prevent airflow through air filter media 10 even if mounted on the downstream face of media 10. In fact, mounting member 23 on a downstream face 12 of media 10 may provide that the upstream face 11 of media 10 (which is the face that an observer may be most easily able to inspect without having to remove media 10 from its position on a filter-support layer 50 of an air-handling system) is most easily visually inspected without any distraction resulting from the presence of the airflow-blocking member itself. In embodiments in which filter media 10 is substantially opaque, no special measures may need to be taken regarding the appearance (e.g. color) of member 23.

However, in some embodiments an airflow-blocking member 23 may be mounted on an upstream 11 face of filter media 10 (e.g. a face that is visually inspected by a user). In many such embodiments, all such layers (e.g. a backing layer and a pressure-sensitive adhesive layer) of airflow-blocking member 23 may be visually clear (e.g., sufficiently translucent, or transparent). In such cases filter media 10 of passivated area 20 will be readily visible through member 23 so that its appearance in comparison to that of filter media 10 of non-passivated area 26 may be easily ascertained. In other embodiments, an outermost layer (e.g. a backing) of member 23 may be chosen to be the same color as the initial color of filter media 10. In such a case, the outermost (visible) layer of such a member will be considered to provide a visually uniform filter life indicator as disclosed herein.

Since air filter 1 does not comprise a rigidifying frame as discussed extensively elsewhere herein, airflow-blocking member 23 by definition is not provided by any portion of (e.g., extension of) a rigidifying frame that is provided as a part of air filter 1.

Figure 6:
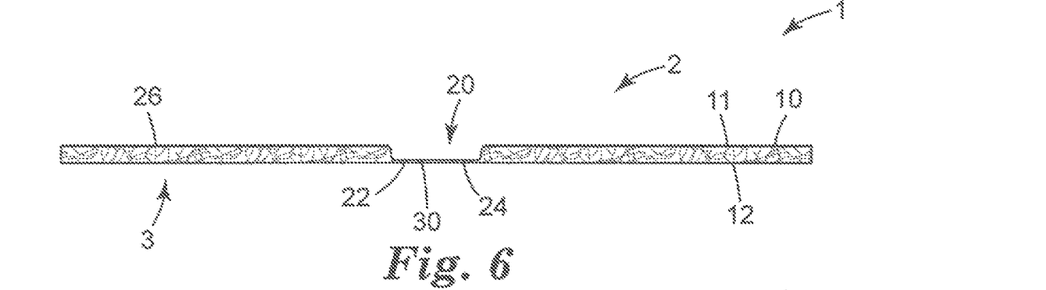
FIG. 6 is a side view of an exemplary air filter comprising a physically passivated area provided by an airflow-blocking layer of densified fibers.

In some embodiments, filter media 10 comprises at least one layer that is a nonwoven fibrous web, and a physically passivated area 22 comprises an area in which at least some fibers of the nonwoven web are collectively densified to form an airflow-blocking layer. This may be conveniently achieved by the use of thermal energy (optionally along with pressure) so as to at least partially melt at least some fibers to cause the fibers to agglomerate into a densified layer 24 as shown in exemplary embodiment in FIG. 6. Such a layer will at least substantially prevent airflow therethrough (in addition, any charged electret moieties that were in the fibers that formed the densified layer, may now be buried within the layer and unable to capture airborne particles). It may not be necessary that the layer be completely impermeable to airflow, as long as it is sufficiently impermeable to allow the methods disclosed herein to be used. In various embodiments, a densified layer 24 that provides a physically passivated areas 22 of filter media 10, may exhibit a 100 cc densometer time of at least about 5 seconds, 10 seconds, 20, seconds, 50 seconds, 100 seconds, or 1000 seconds. It will be appreciated that the densification of the fibers may cause some slight change in the appearance of layer 24 compared to that of areas of undensified fibers. However, as long as the appearance of layer 24 is sufficiently visually similar to that of the initial appearance of the undensified fiber area (that is, non-passivated area 26), layer 24 can still be used as disclosed herein. The imparting of thermal energy (e.g. along with pressure) to achieve the above effects can be performed in any suitable manner, e.g. by the use of an ultrasonic horn, heated calendering with a calendering roll, and so on. It is noted that ultrasonic point-bonds or calendered point-bonds that are often used to bond together the fibers of certain organic polymeric nonwoven webs (e.g., meltspun fibers) will not qualify as passivated areas as defined herein, unless such bonded areas are of sufficient individual size, and are present in sufficient quantity, that a contrast between their appearance and that of the non-bonded areas of the web is readily visible to an observer. Thus in some embodiments, a passivated area as disclosed and defined herein, does not encompass point-bonded areas of a nonwoven web. In other embodiments, point-bonded areas that collectively provide a passivated area, will exhibit an average individual size of at least 1, 2 or 4 square millimeters, and will collectively occupy an area of at least about 1, 2 or 4 square centimeters.

In some embodiments, an area of filter media 10 may be physically passivated by impregnating a flowable material (e.g. a liquid, or a molten polymer) thereinto and then solidifying the material to form a densified, airflow-blocking layer. In similar manner as described above, such a layer need not necessarily be completely impermeable to airflow, and may exhibit any of the densometer times listed above.

Air filter 1 bearing a visually uniform filter life indicator 30 as disclosed herein may be used in any air-handling system. Such an air-handling system might be e.g. a heating-ventilation-air-condition (HVAC) system (whether a centralized system or a so-called mini-split system as described below), a room air purifier, a cabin air filter for a vehicle, a filter for an internal combustion engines, and so on.

With reference to the exemplary design of FIG. 1, in some embodiments air filter 1 may be installed on an upstream face 55 of an arcuate filter-support layer 50 of an air-handling system 100. In particular embodiments, air filter 1 will be installed in an air-handling system that is a so-called mini-split air-handling (e.g. HVAC or air conditioning) system. The ordinary artisan will appreciate that some forced-air systems are centralized air-handling systems (e.g. HVAC systems) in which air to be handled is collected via multiple air-return inlets (e.g., located in multiple rooms in a building). Such a system thus often comprises a single, central blower that is arranged to handle relatively large quantities of air from multiple rooms. Such centralized systems will be distinguished from so-called mini-split systems (often referred to as "ductless" systems) that often collect air locally via a single air return and comprise a blower that is designed to recirculate air within a single room. (Representative mini-split HVAC systems include e.g. the products available from Fujitsu (Tokyo, JP) under the trade designation HALCYON.)

It is noted that FIG. 1 depicts an intake portion of a mini-split air-handling system in idealized, generic representation and is non-limiting. For example, while an air filter is typically positioned upstream of blower 101 (e.g. so that the filter can help to protect blower 101 and thermal-exchange components of the air-handling system from particulate debris), filter 1 is not necessarily required to be in close physical proximity to blower 101. If desired (for e.g. aesthetic purposes and/or to protect filter 1 from damage) a filter cover 60 may be positioned upstream of filter 1 as depicted in FIG. 1. Filter cover 60 should allow sufficient airflow to enable the functioning of the air-handling system and thus may be e.g. a perforated sheet material, a mesh or screen, a louvered or windowed material, and so on, of any suitable type. In many embodiments, filter cover 60 may have a negligible effect on the airflow through filter 1 and into the HVAC intake. In some embodiments, filter cover 60 may be e.g. solid but may be offset outwardly from filter 1 a sufficient distance to allow sufficient airflow thereto.

As shown in closer detail in the exploded view of FIG. 2, in some embodiments air filter 1 will be conformed to the shape of upstream face 55 of arcuate filter-support layer 50 of air-handling system 100. In many embodiments, air filter 1 (e.g., downstream face 12 of air filter media 10) may be in direct contact with upstream face 55 of filter-support layer 50. In various embodiments, filter-support layer 50 may be permanently attached to the air-handling system (e.g., to the housing of the air-handling system intake portion); or, it may be removable from the air-handling system e.g. for ease of installing a filter 1 thereon (after which filter-support layer 50 with filter 1 thereon, is replaced into the air-handling system). In either case, filter-support layer 50 by definition is a component of the air-handling system; it is not a component of filter 1 as filter 1 is supplied to an end user. In other words, no rigidifying perimeter frame, rigidifying support member or the like, that is attached (directly or indirectly) to an air filter as the air filter is supplied to a user, will qualify as a filter-support layer 50 of an HVAC system.

Filter-support layer 50 comprises an upstream face 55 as noted, and a downstream face 56. It comprises an air-transmissive area 53 that comprises through-openings 52 through which air can easily pass to reach the interior of the air-handling system intake portion. However, air-transmissive area 53 also comprises solid portions 51 that serve to support filter 1. Such solid portions 51 may take the form of e.g. struts of a grid or filaments of a mesh or screen (whether regular or irregular in arrangement) as in the exemplary embodiment of FIG. 2; or, air-transmissive area 53 may take the form of a solid sheet material with numerous perforations extending therethrough. In many embodiments, at least air-transmissive area 53 may take the form of a mesh or screen, which may advantageously allow airflow therethrough while adequately supporting filter 1. Some materials comprising randomly oriented fibers (such as e.g. a metal mesh) may comprise through-openings in the form of tortuous paths. (It will be appreciated that in many instances there may not be a bright-line distinction between air-transmissive materials in various categories such as e.g. screens, meshes, grids, perforated sheets and like materials.) In various embodiments, the through-openings of air-transmissive area 53 of filter-support layer 50 may comprise an average diameter (or equivalent diameter in the case of noncircular through-openings) of less than about 8, 6, 4, 3, 2, 1, 0.4, or 0.2 mm.

In some embodiments air-transmissive area 53 may make up a significant portion (e.g., at least 60, 80, 90, or 95% or more), of the total area of filter-support layer 50. In some embodiments, one or more relatively (e.g., completely) non-air-transmissive areas may be provided (one such area 57 is shown in exemplary embodiment in FIG. 2). Such areas may e.g. facilitate attaching filter-support layer 50 to the other components of the air-handling system, installing filter 1 on filter-support layer 50, or may serve any other purpose. It is noted that since filter-support layer 50 is not a part of air filter 1, by definition no non-air-transmissive area (e.g. area 57 of FIG. 2) of filter-support layer 50, nor any solid portion (such as e.g. a strand, filament or rib) 51 of filter-support layer 50, can be equated with an airflow-blocking member 23 of air filter 1 as disclosed herein.

Filter-support layer 50 (e.g., at least the air-transmissive area 53 thereof) may conveniently be provided in a permanently arcuate shape (although it may be reversibly flexible to at least some extent) e.g. by being molded in that shape. Or, in some embodiments filter-support layer 50 may be a metal screen or mesh that has been formed into the desired arcuate shape. Filter 1 may thus be conformed to match that shape when installed on filter-support layer 50. In various embodiments, arcuate filter-support layer 50 may exhibit a radius of curvature (averaged over the length of the air-transmissive area 53 thereof) of less than about 100, 80, 60, 40, 20, or 10 cm.

In some embodiments, a filter support layer 50 may not necessarily be an arcuate layer, and does not necessarily have to be in close proximity to the blower fan of an air-handling system. For example, in some embodiments a mesh screen, louvered cover, perforated grille, or the like, of an air intake or air outlet (e.g. a register) of an air handling system may serve as a filter support layer on which a filter 1 as disclosed herein may be mounted.

Filter 1 may be installed on upstream face 55 of filter-support layer 50 by any suitable means. For example, adhesive strips (e.g., at one or more edges 4 of filter 1) may be provided which can adhesively attach one or more edges of filter 1 to receiving areas of filter-support layer 50. Or, any kind of mechanical fastening system (such as the hook and loop systems mentioned earlier) may be used. In some embodiments, filter 1 (as supplied to an end user) may thus have components mounted thereto to facilitate installation onto filter-support layer 50. In other embodiments, filter 1 as supplied may simply consist of an area of air filter media 10. In such cases, filter-support layer 50 may have components (e.g. pins) e.g. at corners of filter-support layer 50, onto which filter 1 may be impaled. Or, filter-support layer 50 may comprise one or more deformable or non-deformable clips or the like. In some embodiments, fasteners that are supplied separately from filter 1 and from filter-support layer 50 may be used. Any suitable fastener (e.g., chosen from clips, pins, clamps, bands and so on) may be used. Any combination of any suitable fastener or fasteners (whether supplied with filter 1, with filter-support layer 50, and/or supplied separately) may be used as desired.

It will be appreciated that in some embodiments (e.g., in which one or more ends of filter 1 are wrapped around one or more respective ends of filter-support layer 50 and are fastened to the backside thereof), filter 1 may not necessarily be directly attached or adhered to air-transmissive area 53 of filter-support layer 50 (or, to any portion of upstream face 55 of filter-support layer 50). The concept of filter 1 being "installed on" an upstream face 55 of filter-support layer 50 thus does not necessarily require actual direct attachment of the filter to the upstream face. Moreover, in some embodiments the installation may not involve any direct "attachment" of filter 1 to filter-support layer 50 at all. For example, filter 1 may be held in place on the upstream face of filter-support layer 50 by the pressure of being sandwiched between filter cover 60 and filter-support layer 50. Or, ends of filter 1 may be wrapped around edges of filter-support layer 50 and held by pressure between the edges of filter-support layer 50, and surfaces of some other component of the air-handling system, so as to maintain filter 1 in the desired location relative to filter-support layer 50. All such configurations fall under the general category of installing filter 1 on the upstream face of a filter-support layer 50 of an air-handling system.

In many instances a mini-split air-handling system may, in order to minimize the total size of the system (since such systems are often mounted on an inside wall of a room and are thus visible to occupants), have a very limited space between the upstream face 55 of filter-support layer 50 and a downstream face of a filter cover 60. Such a space may often be less than 30, 20 or 10 mm. Thus, in various embodiments, the maximum upstream-downstream thickness of air filter 1 (including any e.g. border strip thereof) may be les than about 30, 25, 20, 15, 10, or 5 mm.

High Bypass Mounting

It has been found that in some embodiments air filter 1 need not necessarily overlie the entire air-transmissive area 53 of the filter-support layer 50. That is, filter 1 may be configured (e.g., shaped and sized) so that when it is installed on the upstream face 55 of filter-support layer 50, at least one bypass region 54 is present in some area of filter-support layer 50 (e.g., near one or more edges thereof) as shown in exemplary embodiment in FIGS. 3 and 4, that allows air to pass through filter-support layer 50 without passing through filter 1. Thus in various embodiments, filter 1 may be configured so that, when it is installed on filter-support layer 50, a bypass ratio (defined as the ratio of the area of bypass region 54 to the total air-transmissive area 53 of filter-support layer 50) is obtained that is at least about 15, 20, 25, or 30%. In other words, in such embodiments air filter media 10 will occupy less than 85, 80, 75, or 70% of the nominal air-transmissive area of filter-support screen. (The terminology nominal is used to denote that any small area occupied by e.g. the solid strands of a filter-support screen 50 will be disregarded in such calculations.) It is noted that in many embodiments filter-support layer 50 may be e.g. a mesh or screen with relatively small through-hole sizes so that any relatively large particulate debris (e.g., pet hair, dirt, and so on) that may bypass filter 1 may still be captured rather than reaching the fan or blower of the air-handling system.

It will be appreciated that a high-bypass air-handling system may rely on multiple passes of air through the air-handling system (e.g. by recirculating room air into the system) in order to achieve the desired air filtration. It will be appreciated that such systems are distinguished from e.g. centralized HVAC systems in which single-pass filtration is desired (that is, in which essentially no air is to be returned to a centralized air-distribution blower that has not first passed through a filter) and in which an air filter is typically installed at a nominally 0% bypass ratio. By way of specific example, in many centralized HVAC systems a framed air filter is inserted into a slot and is seated against retaining flanges (and is held thereagainst by the pressure of the airflow) so as to exhibit a nominal 0% bypass except for e.g. relatively insignificant amounts of air leakage as may occur around the edges of the framed filter). A high bypass ratio air filter as described herein, in contrast, is one that is specifically designed and configured so that when the air filter is installed onto a filter-support layer of an air-handling system (e.g. a mini-split system) a bypass ratio of at least 15% is present.

It will be appreciated that in an air filter that is designed for use in a conventional centralized HVAC system in which high single-pass filtration performance is desired, it would be deemed unsuitable to use an air filter media that includes a passivated area (e.g. a chemically passivated area) that would allow passage of airborne particles therethrough, since (e.g. if such a passivated area were large enough to allow easy visual inspection) this would be expected to significantly lower the single-pass filtration performance. In contrast, in an air-handling system that relies on multiple passes of air (e.g. recirculation of air within a single room) and is thus not concerned with achieving high single-pass filtration performance, such a passivated area may be advantageously used for the purposes disclosed herein without unduly lowering the overall filtration performance.

In some embodiments air filter 1 may be supplied in a size that is pre-configured so that filter 1 is installable (e.g. in a high bypass ratio configuration) on a particular filter-support layer. In other embodiments, it may be supplied in larger sizes (e.g. in a roll) and cut to fit by an end user, in accordance with instructions for installing filter 1. (The special case in which large-sized filter media is provided to an end user together with instructions to cut the filter media into a size and shape that provides a high bypass ratio installation will be considered to constitute the configuring of an air filter in a high bypass ratio configuration). In some embodiments, multiple filters 1 (whether already sized for a particular use, or whether e.g. supplied as a roll from which individual filters 1 are then separated) may be packaged together as a kit (e.g. along with instructions). In particular embodiments a filter or filters may be supplied in a "rolled-up" configuration with a relatively small radius of curvature. Any such filter may be unrolled (conformed) to the desired extent (i.e., to match the curvature of a filter-support layer 50 on whose upstream face the filter is to be installed). Any such filter falls within the herein-disclosed concept of a conformable filter (even e.g. if the filter is not necessarily ever completely unrolled to a nominally planar configuration prior to being installed onto a filter-support layer).

Air filter 1 may thus be installed on a support screen of an air-handling system, e.g. in a high bypass configuration if desired. The air-handling system may then be operated as desired (for example to continuously or semi-continuously recirculate air, e.g. within a room). The visual appearance of the air filter (e.g. the upstream face of the filter, which will be visible without having to remove the filter from the filter-support layer) can then be monitored at desired intervals over the useful lifetime of the filter media. Specifically, the color of the non-passivated area(s) 26 of the filter can be compared to the color of the passivated area(s) 20. With continued operation of the air-handling system (e.g. in an environment with an average PM2.5 particle level of 15 microgram per cubic meter or higher), the color of the non-passivated area of the filter media will change significantly (e.g. darken from an initial white or beige appearance to a dark grey or black appearance) due to the capture of airborne particles (e.g., in particular due to the capture of PM2.5 particles such as soot, which are often very dark in color). However, over this time frame the visual appearance of the passivated area will remain at least generally, e.g. substantially, the same. In particular, the passivated area will not exhibit any kind of gradient in which laterally outward portions of the passivated area darken significantly while interior regions of the passivated area retain their original appearance.

A sufficiently large contrast between the visual appearance of the non-passivated area is an indication that the useful lifetime of the filter media (which is defined herein as meaning that the percent efficiency of the filter media has dropped below half of its initial value, as noted earlier) has been reached and that the filter may be replaced if high filtration efficiency is deemed to be desirable. In some embodiments, instructions may be included to aid the user in making such determinations. In particular embodiments a reference color bar e.g. showing an approximation of a visual appearance that corresponds to the end of the useful lifetime of the filter media may be included with instructions that accompany the air filter. Or, such a reference color bar may be included with virtual instructions (e.g. residing on a website to which a user is directed). In some embodiments, such a reference color bar may reside on the air filter itself (e.g., may be disposed on a border strip of the air filter). In other embodiments, the air filter does not comprise any kind of reference color bar.

It will be appreciated that, as evidenced in the Working Examples, the end of the useful lifetime of an air filter configured and used as described herein may be manifested by a drop in filtration efficiency even while the pressure drop (flow resistance) of the filter may remain quite low. While not wishing to be limited by theory or mechanism, it may be that the drop in filtration efficiency results from at least some airborne particles being more easily able to penetrate through the filter due to the charged electret moities being locally obscured or shielded by (previously-captured) PM2.5 particles. Such a circumstance can be contrasted with those in which the usable lifetime of a filter is limited by large-scale clogging of the filter with particles such that the flow resistance of the filter media increases drastically.

Again while not wishing to be limited by theory or mechanism, it is postulated that in environments in which a relatively high concentration (e.g. 15, 20, or 35 micrograms per cubic meter or more) of PM2.5 particles is present (e.g. as soot or "black carbon" generated by use of coal for heating, biofuel for cooking, diesel fuel for transportation, and so on), the local shielding of charged electret moities by PM2.5 particles so as to significantly reduce the filtration efficiency of the filter media, may occur on a faster time scale than any large-scale clogging of the filter media (which clogging may be the result of the (slower) accumulation of much larger particles). The discoloration (e.g., darkening) of the unpassivated areas of the filter media seems to correlate well with this reduction in filtration efficiency. In other words, the arrangements and methods disclosed herein can allow monitoring of changes in filtration efficiency (in particular, of relatively low-flow-resistance filtration media comprising charged electret moities) in environments in which significant amounts of PM2.5 particles are present, in a manner that may not be achievable by methods that rely on monitoring pressure drop. This may be particularly advantageous when used in so-called mini-split air-handling systems, in view of the fact that the air-return intakes of mini-split air-handling systems are often located high off the floor rather then near the floor as is often the case with conventional centralized HVAC systems, thus causing at least some mini-split systems to be exposed to a particle-size population that is skewed more toward PM2.5 particles rather than larger particles (since PM2.5 particles settle much more slowly than larger particles).

LIST OF EXEMPLARY EMBODIMENTS

Embodiment 1 is an air filter including a visually uniform filter life indicator, the air filter comprising: a conformable, unframed air filter media that is installable on at least a portion of an upstream face of a filter-support layer of an air-handling system, wherein the conformable, unframed air filter media comprises at least one passivated area that provides a visually uniform filter life indicator of the air filter.

Embodiment 2 is the air filter of embodiment 1 wherein the passivated area is configured to, upon exposure of the air filter to an airstream containing PM2.5 particles in a concentration of at least 15 micrograms per cubic meter, exhibit a uniform color throughout the entirety of the passivated area over a useful lifetime of the air filter.

Embodiment 3 is the air filter of any of embodiments 1-2 wherein the air filter is a high bypass ratio air filter comprising a conformable, unframed air filter media that is configured to be installed on a portion of an upstream face of a filter-support layer of an air-handling system, in a high bypass ratio configuration in which the air filter media occupies less than 85% of a nominal air-transmissive area of the filter-support layer.

Embodiment 4 is the air filter of any of embodiments 1-3 wherein the air filter media is installable on a portion of an upstream face of a filter-support layer of a mini-split air-handling system that is not a centralized air conditioning or HVAC system.

Embodiment 5 is the air filter of any of embodiments 1-4 wherein the air filter media comprises at least one layer that is a nonwoven fibrous web comprising at least some fibers that comprise charged electret moities.

Embodiment 6 is the air filter of any of embodiments 1-5 wherein the passivated area is a chemically passivated area.

Embodiment 7 is the air filter of embodiment 6 wherein the chemically passivated area of the air filter media permits airflow therethrough and wherein a ratio of a Quality Factor exhibited by the chemically passivated area to a Quality Factor exhibited by the air filter media is less than about 0.5.

Embodiment 8 is the air filter of any of embodiments 1-5 wherein the passivated area is a physically passivated area.

Embodiment 9 is the air filter of embodiment 8 wherein an airflow-blocking member is affixed to a major surface of the physically passivated area of the air filter media.

Embodiment 10 is the air filter of embodiment 8 wherein in the physically passivated area, at least some fibers of the air filter media are collectively densified to form an airflow-blocking layer.

Embodiment 11 is the air filter of any of embodiments 1-10 wherein the air filter media is conformable into an arcuate shape so that the filter media can be installed on an upstream face of an arcuate filter-support layer of an air-handling system.

Embodiment 12 is the air filter of any of embodiments 1-11 wherein the filter media is pleated with a pleat height that is less than one cm and wherein the air filter exhibits a maximum thickness that is less than one cm.

Embodiment 13 is the air filter of any of embodiments 1-11 wherein the filter media is unpleated.

Embodiment 14 is a method of filtering air, the method comprising: installing an air filter comprising a conformable, unframed air filter media on a filter-support layer of an air-handling system, wherein the conformable, unframed, filter media comprises at least one passivated area that provides a visually uniform filter life indicator; and, exposing the filter-support layer with the air filter installed thereon to an airstream of moving air so that at least some of the moving air passes through the air filter media.

Embodiment 15 is the method of embodiment 14, the method comprising: installing the air filter on the filter-support layer so that the air filter media occupies less than 85% of a nominal air-transmissive area of the filter-support layer and, exposing the filter-support layer with the air filter installed thereon to an airstream of moving air so that a first portion of the airstream passes through the air filter media and a second portion of the airstream passes around lateral edges of the air filter media so as to pass through the filter-support layer while bypassing the air filter media.

Embodiment 16 is the method of any of embodiments 14-15 wherein the airstream of moving air exhibits an average PM2.5 particle concentration of at least about 15 micrograms per cubic meter.

Embodiment 17 is a method of making a conformable, unframed air filter including a visually uniform filter life indicator, the method comprising: physically passivating at least one area of a conformable, unframed air filter media to form a visually uniform filter life indicator.

Embodiment 18 is the method of embodiment 17, wherein the step of physically passivating the at least one area of the air filter media comprises affixing an airflow-blocking member to a major surface of the at least one area of the area filter media.

Embodiment 19 is the method of embodiment 17, wherein the step of physically passivating the at least one area of the air filter media comprises densifying at least some fibers within the at least one area to form an airflow-blocking layer.

Embodiment 20 is the method of any of embodiments 17-19 wherein the method further comprises configuring the air filter media so that it provides a high bypass ratio air filter.

Embodiment 21 is a method of making a conformable, unframed air filter including a filter life indicator, the method comprising: chemically passivating at least one area of a conformable, unframed air filter media to form a visually uniform filter life indicator.

Embodiment 22 is the method of embodiment 21 wherein the air filter media comprises at least one layer that is a nonwoven fibrous web comprising at least some fibers that comprise charged electret moities, and wherein the step of chemically passivating the at least one area of the air filter media comprises exposing the at least one area to an electret-deactivating treatment so that the at least one electret-deactivated area of the air filter media permits airflow therethrough and wherein a ratio of a Quality Factor exhibited by the chemically passivated area to a Quality Factor exhibited by the air filter media is less than about 0.5.

Embodiment 23 is the method of embodiment 21 wherein the step of chemically passivating the at least one area of the air filter media comprises screening the at least one area of the air filter media during a charging process so that the at least one screened area of the air filter media permits airflow therethrough and wherein a ratio of a Quality Factor exhibited by the chemically passivated area to a Quality Factor exhibited by the air filter media is less than about 0.5.

Embodiment 24 is the method of any of embodiments 21-23 wherein the method further comprises configuring the air filter media so that it provides a high bypass ratio air filter.

Embodiment 25 is the method of embodiment 14 using an air filter of any of embodiments 1-13.

EXAMPLES

Test Methods

% Penetration, Filtration Efficiency, Pressure Drop, and Quality Factor

Percent penetration, filtration efficiency, pressure drop and the filtration Quality Factor (QF) of a web sample is determined using a challenge aerosol containing NaCl (sodium chloride) particles, delivered at a flow rate of approximately 85 liters/min to provide a face velocity of 14 cm/s, and evaluated using a TSI™ Model 8130 high-speed automated filter tester (commercially available from TSI Inc.). For NaCl testing, the aerosol may contain particles with a diameter of approximately 0.26 μm mass mean diameter, and the Automated Filter Tester may be operated with the heater on and the particle neutralizer on. Calibrated photometers may be employed at the filter inlet and outlet to measure the particle concentration and the % particle penetration through the filter. Filtration efficiency can be calculated as 100 minus the % particle penetration (and is reported in percent). An MKS pressure transducer (commercially available from MKS Instruments) may be employed to measure pressure drop (ΔP, mm H2O) through the filter. The equation:

$$QF = \frac{-\ln\left(\frac{\% \text{ Particle Penetration}}{100}\right)}{\Delta P}$$

may be used to calculate QF. Units of QF are inverse pressure drop (reported in 1/mm H₂O).

Example 1

A sample of filter media was obtained from 3M Company, St. Paul Minn., of the general type described in U.S. Pat. No. 8,162,153. The filter media was a spunbonded nonwoven web comprising charged electret moities, was unpleated, and comprised fibers that included white pigment so that the filter media exhibited a very white color. The filter media exhibited a filtration efficiency of approximately 52%, a filtration Quality Factor of approximately 1.7, and a pressure drop of approximately 0.42 mm of water. The filter media was manually configured (by cutting with scissors) and installed onto the front face of a honeycomb support layer.

The dimensions of the resulting air filter were approximately 22 cm by 34 cm. A piece of adhesive tape (obtained from 3M Company under the trade designation SCOTCH MAGIC TAPE) of approximately 19 mm in width and 75 mm in length was adhesively attached to a major front surface of the filter media. The air filter was then installed, with the adhesive tape on the upstream surface of the filter media, into an air-handling system available from 3M Company under the trade designation KJEA200e. (This particular air-handling system was a room air purifier configured to receive a planar air filter, thus in this prototype testing the air filter was not curved into an arcuate shape.)

The air-handling system was then operated continuously at the highest fan speed setting for approximately three days, in an indoor environment into which a considerable amount of outdoor air was continually introduced. The outdoor PM2.5 level averaged approximately 18 microgram per cubic meter during this time, based on analysis of hourly data published by a local air quality monitoring station.

Figure 7:
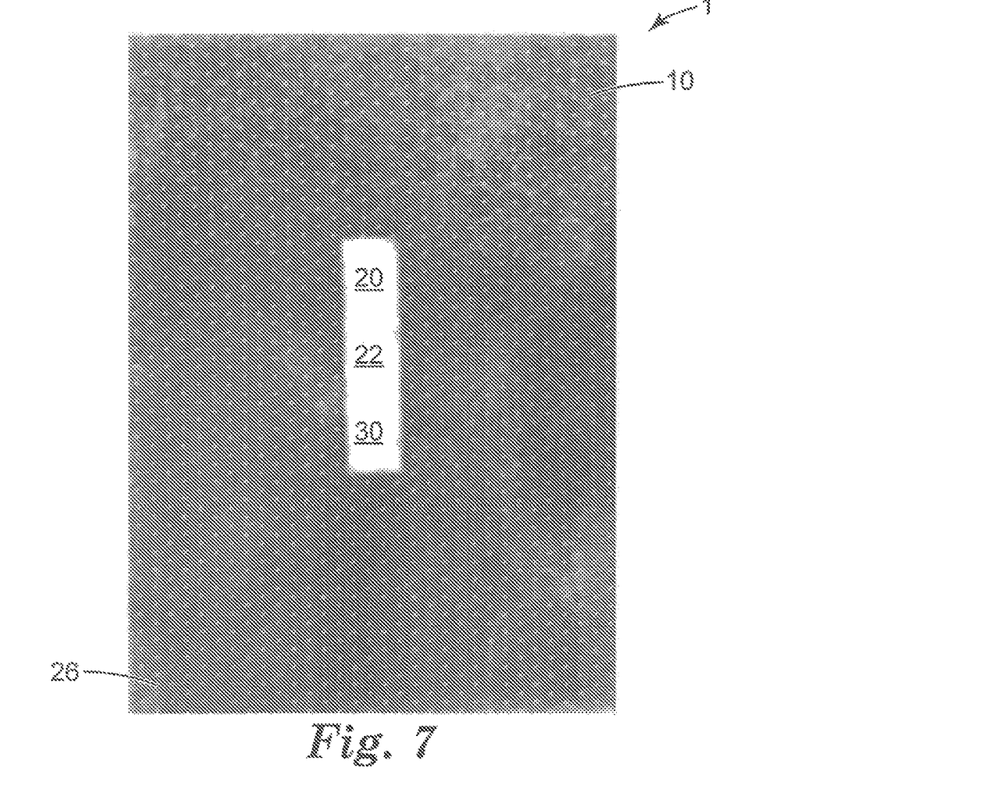
FIG. 7 is a photograph of a Working Example air filter comprising a physically passivated area, after a period of use.

At the end of the three day period, the sample air filter was removed and visually inspected (an optical photograph of the air filter (taken from the upstream side) is presented in FIG. 7). The non-passivated area 26 of the air filter had darkened to a very dark grey color. In sharp contrast, the passivated area 20 exhibited an appearance that appeared to be very close to the original, very white color of the air filter media. No geometric variation (e.g. gradient) in the color of the passivated area 20 was observed, except for a few very small areas at the edge of the passivated area, in which areas it appeared that the edge of the adhesive tape had become very slightly detached from the filter media (it was believed that the PSA that was used in this adhesive tape product was not sufficiently aggressive to remain firmly attached to the fibrous nonwoven but rather separated very slightly from the fibers at the edges). These insignificant artifacts notwithstanding, human volunteers were readily able to distinguish the sharp contrast between the very white color of the passivated area in comparison to the dark grey color of the non-passivated area. Volunteers were also able to ascertain that the passivated area exhibited an at least substantially uniform appearance rather than exhibiting any kind of gradient in color. (The small dots that are visible in FIG. 7, are point-bonds of the nonwoven web.)

Example 2

A sample of filter media was obtained from 3M Company, St. Paul Minn., of the same type and size used in Example 1. The filter media was installed on a filter-support layer (a plastic screen) of a mini-split air-handling system available from Hisense Kelon (Foshon, China) under trade designation KFR-35G/VRFDBp-A3. The dimensions of the resulting air filter was approximately X cm by Y cm. Portions of the air filter media were deactivated by way of having liquid isopropanol applied thereto from a squirt bottle and allowed to soak thereinto. The isopropanol was applied in elongated strips across the width of the air filter samples, one strip of approximately 5 mm in height, and one of approximately 15 mm in height. The sample was then exposed to airflow for approximately 5 minutes to evaporate the isopropanol from the filter media.

The air filter was then installed onto the upstream surface of a filter-support layer (a plastic mesh screen) in the mini-split air-handling system. The air inlet of the system was located approximately 30-36 inches above floor level. The air-handling system was then operated continuously at the maximum fan speed setting for approximately three days, in an indoor environment into which a considerable amount of outdoor air was continually introduced. The outdoor PM2.5 level averaged approximately 56 microgram per cubic meter during this time, based on analysis of hourly data published by a local air quality monitoring station.

Figure 8:
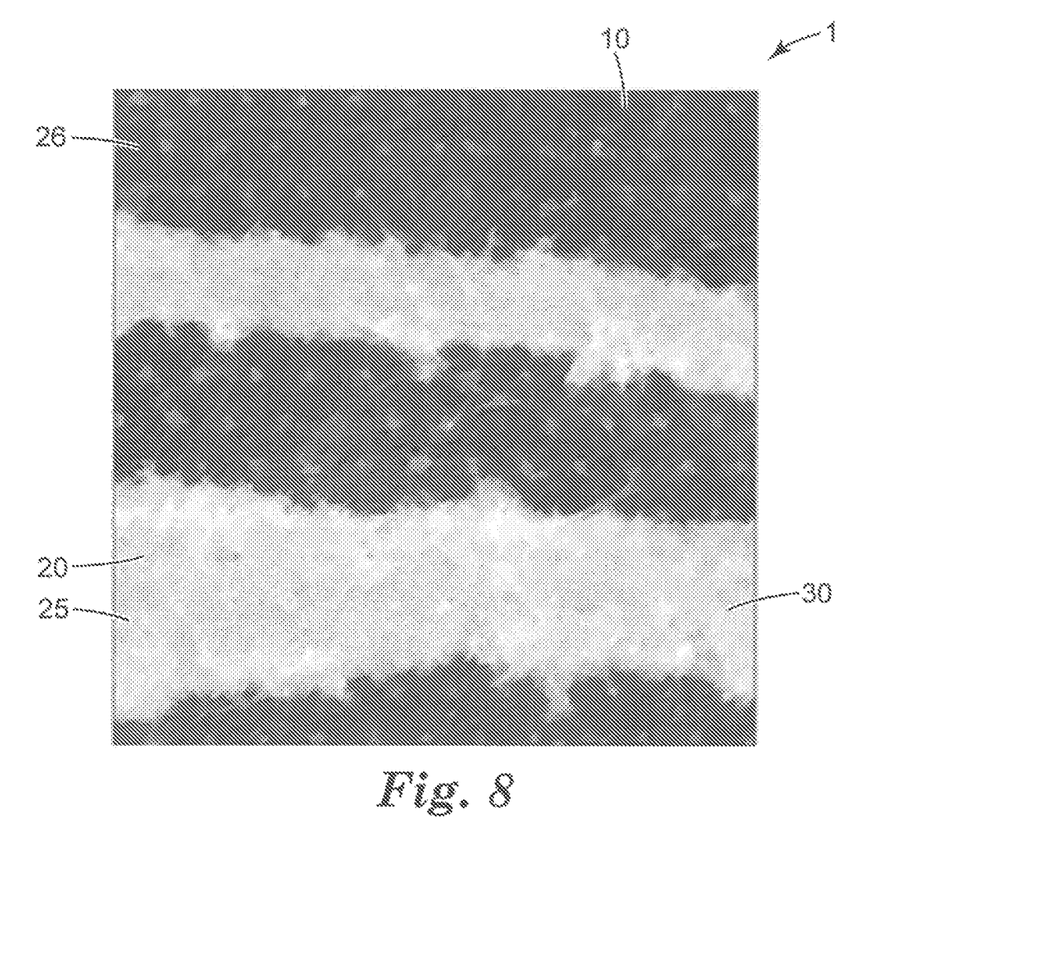
FIG. 8 is a magnified photograph of a portion of a Working Example air filter comprising a chemically passivated area, after a period of use.

At the end of the three day period, the sample air filter was removed and visually inspected (an optical photograph of a portion of the air filter is presented in FIG. 8). The non-passivated areas 26 of the air filter had darkened significantly to a dark grey color. The passivated areas 20 appeared to remain very close to the original color of the air filter media. No geometric variation (e.g. gradient) in the color of the passivated areas 20 was observed. The irregularities in the edges of passivated strips 20 that are evident in FIG. 8, were believed to result from the fact that the isopropanol had wetted into the fibrous material and had wicked laterally (along the major plane of the fibrous web) slightly with the result that the deactivated strips, as achieved by the alcoholic treatment, did not have a sharp edge. These artifacts notwithstanding, human volunteers were readily able to distinguish the sharp contrast between the white color of the passivated area in comparison to the dark grey color of the non-passivated area. Volunteers were also able to ascertain that the passivated area exhibited an at least substantially uniform appearance (notwithstanding the ragged edge as noted above) rather than exhibiting any kind of gradient in color.

The sample air filter was then reinstalled into the mini-split air-handling system which was operated continuously for an estimated additional eight days (the system was actually left in the "On" configuration for an additional eleven days, but it appeared that the building lost power over a holiday weekend thus subtracting approximately two-three days). The sample air filter was again removed and visually inspected. The unpassivated areas of the filter media had darkened further. The passivated areas had darkened slightly, to a very light grey color that was still extremely easily distinguishable from the appearance of the unpassivated areas. The passivated areas still displayed a very distinct edge with no gradient being observed in the passivated areas (thus attesting that the irregularity of the edges of the passivated areas was likely due to wicking artifacts during the deactivation process).

The sample air filter was then reinstalled into the mini-split air-handling system which was operated continuously for an estimated additional six days (the total run time was thus in the range of approximately seventeen days). The sample air filter was again removed and visually inspected. The unpassivated areas of the filter media had darkened still further to an even darker grey appearance. The passivated areas had darkened slightly, to a light grey color that was still very easily distinguishable from the appearance of the unpassivated areas. (It was believed that at this point the air filter was far past the end of its useful lifetime.) The passivated areas still displayed a very distinct edge with no gradient being observed in the passivated areas.

At the end of this run time, the non-passivated area of the filter media exhibited a filtration efficiency of approximately 18 percent and a pressure drop of approximately 0.45 mm of water (the filter media as received exhibited a filtration efficiency of approximately 52 percent and a pressure drop of approximately 0.42 mm of water). It was thus evident that the filtration efficiency had changed significantly even though the pressure drop (flow resistance) exhibited almost no change. That is, evaluation of flow resistance/pressure drop would not be expected to reveal any change in filtration efficiency during this time, whereas the arrangements disclosed herein (relying on inspection of a passivated area that provided a visually uniform filter life indicator) readily indicated a change in filtration efficiency.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document incorporated by reference herein, this specification as written will control.

What is claimed is:

1. An air filter including a visually uniform filter life indicator, the air filter comprising:
    a conformable, unframed air filter media that is installable on at least a portion of an upstream face of a filter-support layer of an air-handling system,
        wherein the conformable, unframed air filter media comprises at least one chemically passivated area that provides a visually uniform filter life indicator of the air filter.

2. The air filter of claim 1 wherein the passivated area is configured to, upon exposure of the air filter to an airstream containing PM2.5 particles in a concentration of at least 15 micrograms per cubic meter, exhibit a uniform color throughout the entirety of the passivated area over a useful lifetime of the air filter.

3. The air filter of claim 1 wherein the air filter is a high bypass ratio air filter comprising a conformable, unframed air filter media that is configured to be installed on a portion of an upstream face of a filter-support layer of an air-handling system, in a high bypass ratio configuration in which the air filter media occupies less than 85% of a nominal air-transmissive area of the filter-support layer.

4. The air filter of claim 1 wherein the air filter media is installable on a portion of an upstream face of a filter-support layer of a mini-split air-handling system that is not a centralized air conditioning or HVAC system.

5. The air filter of claim 1 wherein the air filter media comprises at least one layer that is a nonwoven fibrous web comprising at least some fibers that comprise charged electret moities.

6. The air filter of claim 1 wherein the chemically passivated area of the air filter media permits airflow therethrough and wherein a ratio of a Quality Factor exhibited by the chemically passivated area to a Quality Factor exhibited by the air filter media is less than about 0.5.

7. The air filter of claim 1 wherein the air filter media is conformable into an arcuate shape so that the filter media can be installed on an upstream face of an arcuate filter-support layer of an air-handling system.

8. The air filter of claim 1 wherein the filter media is pleated with a pleat height that is less than one cm and wherein the air filter exhibits a maximum thickness that is less than one cm.

9. The air filter of claim 1 wherein the filter media is unpleated.

10. The air filter of claim 1 wherein the air filter media comprises charged electret moities and wherein the chemically passivated area exhibits a reduced number of charged electret moities in comparison to the air filter media.

11. The air filter of claim 10 wherein a ratio of a Quality Factor exhibited by the chemically passivated area to a Quality Factor exhibited by the air filter media is less than 0.5.

12. A method of filtering air, the method comprising:
    installing the air filter of claim 1 on a filter-support layer of an air-handling system, and,
    exposing the filter-support layer with the air filter installed thereon to an airstream of moving air so that at least some of the moving air passes through the air filter media.

13. The method of claim 12, the method comprising:
    installing the air filter on the filter-support layer so that the air filter media occupies less than 85% of a nominal air-transmissive area of the filter-support layer; and,
    exposing the filter-support layer with the air filter installed thereon to an airstream of moving air so that a first portion of the airstream passes through the air filter media and a second portion of the airstream passes around lateral edges of the air filter media so as to pass through the filter-support layer while bypassing the air filter media.

14. The method of claim 12 wherein the airstream of moving air exhibits an average PM2.5 particle concentration of at least about 15 micrograms per cubic meter.

* * * * *